US007006513B1

(12) United States Patent
Ali et al.

(10) Patent No.: US 7,006,513 B1
(45) Date of Patent: Feb. 28, 2006

(54) METHOD AND SYSTEM FOR PIPELINING PACKET SELECTION

(75) Inventors: Shahzad Ali, Rohnert Park, CA (US); Stephen J. West, Petaluma, CA (US); Lei Jin, Irvine, CA (US)

(73) Assignee: Turin Networks, Petaluma, CA (US)

( * ) Notice: Subject to any disclaimer, the term of this patent is extended or adjusted under 35 U.S.C. 154(b) by 883 days.

(21) Appl. No.: 09/854,379

(22) Filed: May 11, 2001

(51) Int. Cl.
*H04L 12/56* (2006.01)

(52) U.S. Cl. ...................... 370/414; 370/411; 370/416; 370/418

(58) Field of Classification Search ......... 370/411–418
See application file for complete search history.

(56) References Cited

U.S. PATENT DOCUMENTS

| | | | | |
|---|---|---|---|---|
| 5,305,310 | A * | 4/1994 | Itoh et al. | 370/392 |
| 5,463,620 | A * | 10/1995 | Sriram | 370/412 |
| 5,519,698 | A * | 5/1996 | Lyles et al. | 370/411 |
| 5,850,399 | A * | 12/1998 | Ganmukhi et al. | 370/412 |
| 5,930,256 | A * | 7/1999 | Greene et al. | 370/397 |

OTHER PUBLICATIONS

Nick McKeown, Martin Izzard Adisak Mekkittikul, William Ellersick, Mark Horowitz, "The Tiny Tera: A Packet Switch Core", Dept. of electrical Enginerring & Computer Science, Stanford University, Stanford, CA 94305-4070, DSP R&D Center, Corporate Research & Development, Texas Instruments, Incorp., PO Box 655474, MS446, Dallas, TX 75265.

* cited by examiner

*Primary Examiner*—Brian Nguyen
*Assistant Examiner*—Tri H. Phan
(74) *Attorney, Agent, or Firm*—Blakely, Sokoloff, Taylor & Zafman LLP

(57) ABSTRACT

A method for selecting packets comprises pipelining execution of packet selection processes so that execution of each of the packet selection processes occurs at different levels of a scheduling hierarchy. At least two different packets are selected at two different times in response to execution of the packet selection processes.

21 Claims, 5 Drawing Sheets

METHOD AND SYSTEM FOR PIPELINING PACKET SELECTION

FIELD OF THE INVENTION

The present invention relates generally to field of data switching. More specifically, the present invention is directed to selecting packets to send from a switch.

BACKGROUND

The desire to integrate data, voice, image, video and other traffic over high speed digital trunks has led to the requirement for faster networks including the capability to route more information faster from one node to another node. A switch performs this routing of information. Generally, the switch consists of three logical elements: ports, a switch fabric and a scheduler.

Routing and buffering functions are two major functions performed by a switch fabric. New packets arriving at an ingress are transferred by the scheduler across the switch fabric to an egress. The ingress refers to a side of the switch which receives arriving packets (or incoming traffic). The egress refers to a side of the switch which sends the packets out from the switch.

Most of the switches today are implemented using a centralized crossbar approach. FIG. 1 is an exemplary illustration of a centralized crossbar switch. The packets arrive at the centralized crossbar switch 100 at multiple ingress ports 105 on the ingress 102. They are transferred across the switch fabric 110 to multiple egress ports 115 on the egress 104 and then sent out to an output link (not shown). The centralized crossbar switch 100 can transfer packets between multiple ingress port-to-egress port connections simultaneously.

A centralized scheduler controls the transfer of the packets from the ingress ports 105 to the egress ports 115. Every packet that arrives at the ingress ports 105 has to be registered in the centralized scheduler. Each packet then waits for a decision by the centralized scheduler directing it to be transferred through the switch fabric 110. With fixed size packets, all the transmissions through the switch fabric 110 are synchronized.

Each packet belongs to a flow, which carries data belonging to an application. A flow may have multiple packets. There may be multiple flows arriving at the ingress ports 105 at the same time. Since the packets in these multiple flows may be transferred to the same egress port, each of these packets waits for its turn in ingress buffers (not shown) in the ingress 102.

The centralized scheduler examines the packets in the ingress buffers and chooses a set of conflict-free connections among the appropriate ingress ports 105 and egress ports 115 based upon the configuration of the switch fabric 110. One of the egress ports 115 may receive packets from one or more ingress ports 105. However, at any one time, the centralized scheduler ensures that each ingress port is connected to at most one egress port, and that each egress port is connected to at most one ingress port.

Each packet transferred across the switch fabric 110 by the centralized scheduler waits in egress buffers (not shown) in the egress 104 to be selected by the centralized scheduler for transmission out of the switch. The centralized scheduler places the selected packets in the appropriate egress ports 115 to have the packets transmitted out to an output link.

There are different queuing disciplines used to select the packets from the egress queues. Fast queuing disciplines reduce overflow of the egress buffers and therefore prevent data loss. Traditionally, these queuing disciplines allow packets to be selected in serial. For example, a search for a next packet cannot be initiated until a packet is selected by a previous search. When a packet search and selection process takes "n" time slots, the output link has to wait for "n" time slots to receive a packet. When the search and selection process is complex to accommodate, for example, multiple traffic classes, the number "n" can be large, and it would take longer for the output link to receive a packet. Therefore, the serial approach to search and select packets is not efficient.

SUMMARY OF THE INVENTION

A method and apparatus for selecting packets in a scheduling hierarchy is disclosed. In one embodiment, a method for selecting packets comprises pipelining execution of packet selection processes so that execution of each of the packet selection processes occurs at different levels of a scheduling hierarchy. At least two different packets are selected at two different times in response to execution of the packet selection processes.

Other objects, features and advantages of the present invention will be apparent from the accompanying drawings and from the detailed description which follows.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

Figure 1:
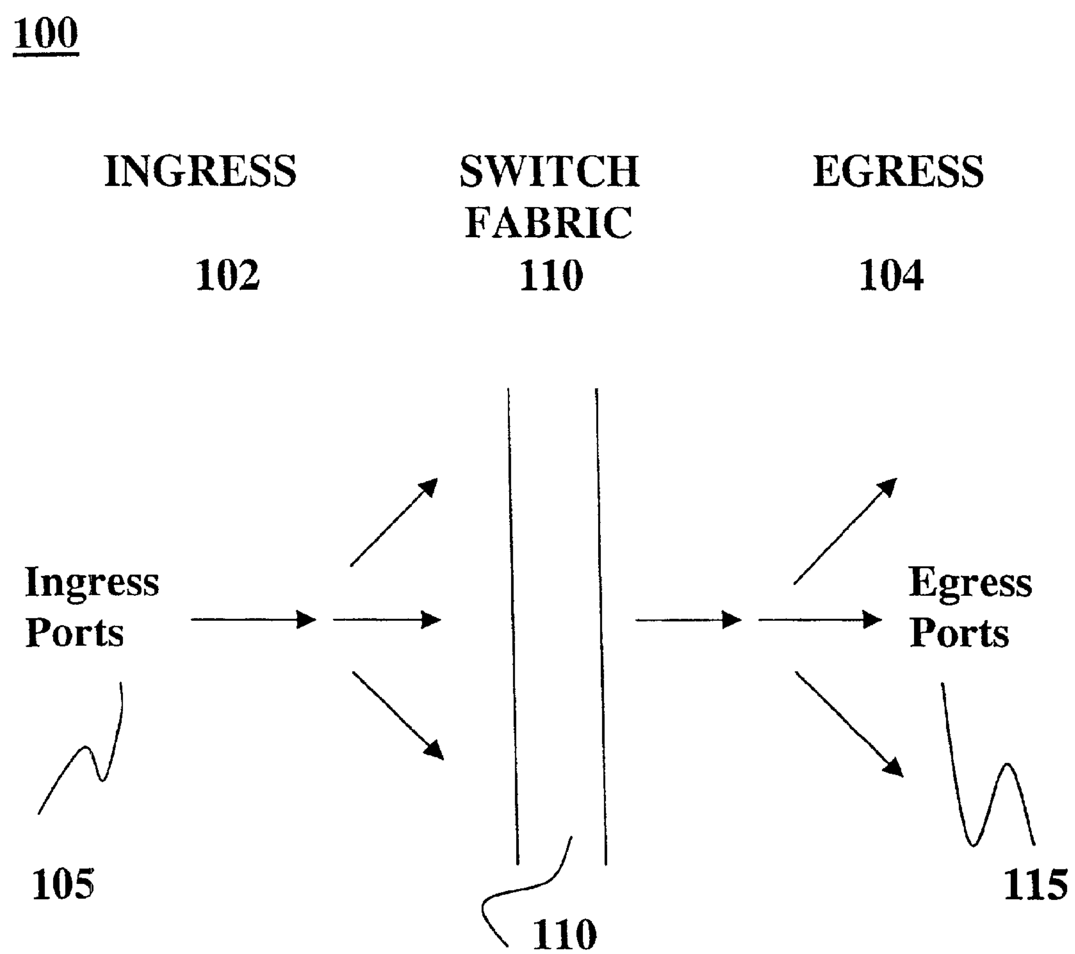
FIG. 1 is an exemplary diagram of a centralized crossbar switch.

A method and apparatus for selecting packets from the egress queues for sending to the output link is disclosed. The method improves packet selection time by having multiple overlapping packet selection processes.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of processes leading to a desired result. The processes are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to system for performing the operations herein. This system may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other system. Various general-purpose systems may be used with programs in accordance with the teachings herein, or it may prove convenient to construct more specialized system to perform the required method processes. The required structure for a variety of these systems will appear from the description below. In addition, the present invention is not described with reference to any particular programming language. It will be appreciated that a variety of programming languages may be used to implement the teachings of the invention as described herein.

Overview

Figure 2:
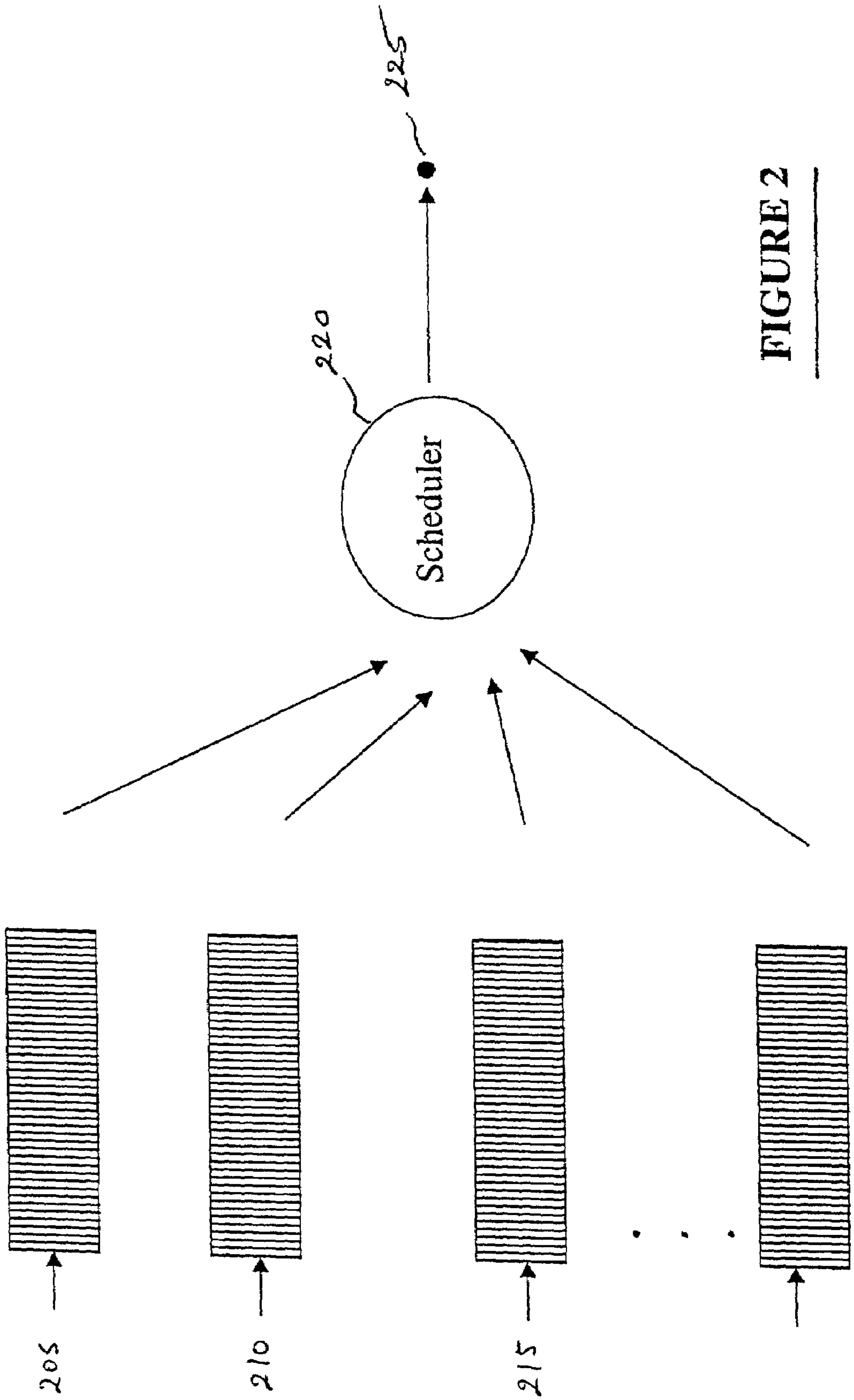
FIG. 2 is an exemplary diagram illustrating egress queues and a scheduler.

FIG. 2 is an exemplary diagram illustrating egress queues and a scheduler. The egress queues 205–215 store packets from multiple flows. The number of queues varies depending on the implementation. Each queue may be associated with a priority class such as, for example, real time, best effort, etc. A packet from the egress queues 205–215 is selected by the scheduler 220 and sent out to the output link 225. The packet selection process needs to be performed quickly by the scheduler 220 so that new packets are not prevented from occupying space in the egress queues 205–215 because the egress queues 205–215 are full. For example, when the egress queues 205–215 are full, new packets sent across a switch fabric (not shown) may be discarded. The scheduler 220 may make its packet selection based on different priority levels associated with the egress queues 205–215. The packet selection technique described herein may handle packets from various applications such as, for example, ATM (Asynchronous Transfer Mode) switching, IP (Internet Protocol) switching, etc. The scheduler 220 may be the centralized scheduler discussed in FIG. 1, or it may be an egress scheduler in a distributed arbitration architecture where there are separate ingress and egress schedulers. In the distributed arbitration architecture, the ingress scheduler processes packets in the ingress and the egress scheduler processes packets in the egress.

Figure 3:
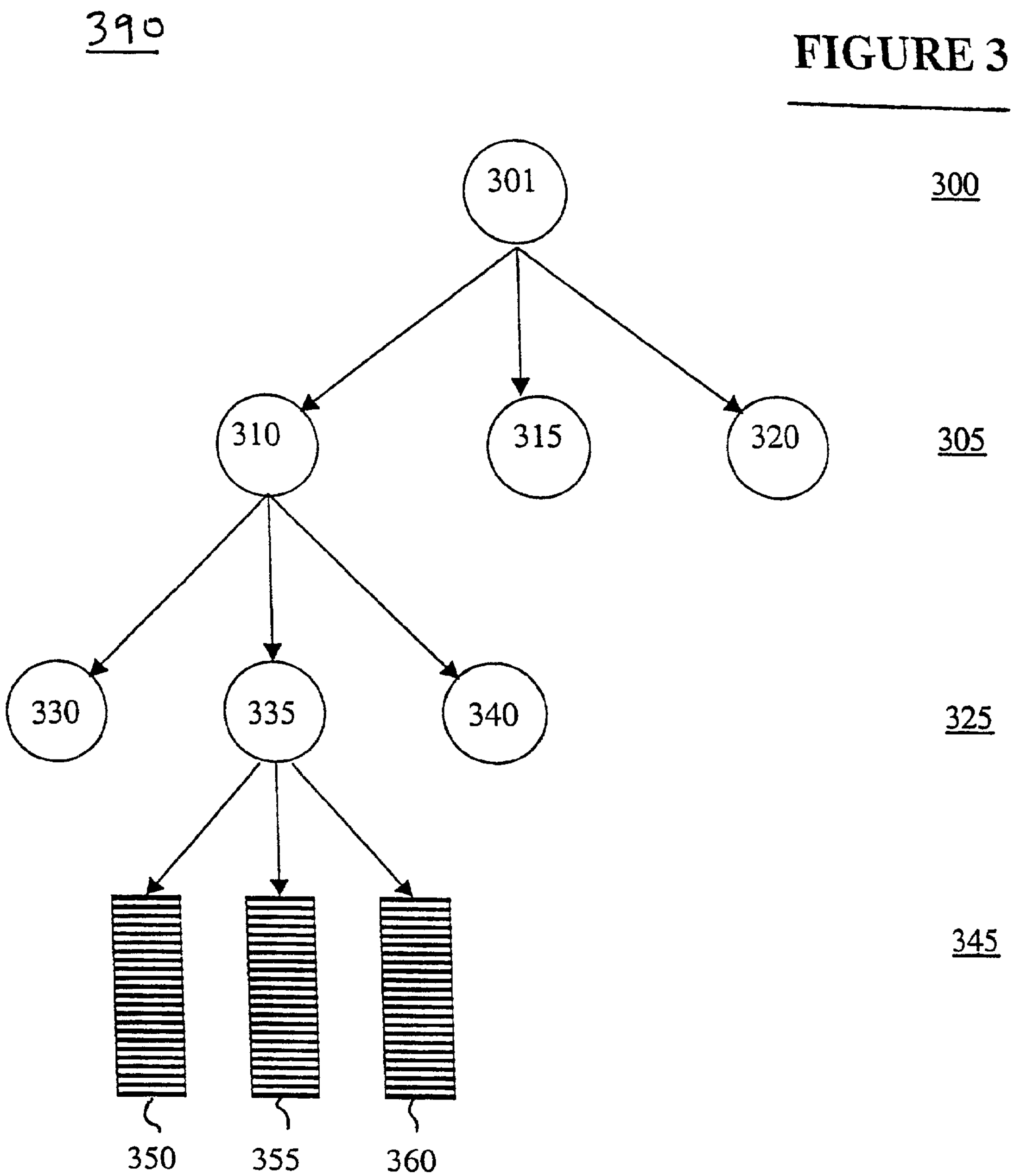
FIG. 3 is an exemplary diagram illustrating one embodiment of a scheduling hierarchy.

FIG. 3 is an exemplary diagram illustrating one embodiment of a scheduling hierarchy. With the scheduling hierarchy, a hierarchy 390 is used by the scheduler to select a packet to send to the output link (not shown). Referring to FIG. 3, the packets from multiple flows are stored in the egress queues 350–360 located at the leaf level 345 of the hierarchy 390. The scheduler selects one packet from the egress queues 350–360 using a packet selection process. For example, the packet selection process may select a packet based on contracted rate of the packet, an arrival time of the packet at the egress buffer and a departure time of a previous packet from the a same flow. The packet selection process is made through a hierarchical dequeue process that starts at a top or root level 300 of the hierarchy 390 and flows down to a bottom or leaf level 345 of the hierarchy 390.

The egress queues 350–360 may be divided by traffic classes. For example, the egress queues 350 may be a first-in-first-out (FIFO) queue storing packets associated with best effort (BE) flows. A best effort flow is a flow that may not need immediate attention such as, for example, a flow associated with email traffic. The egress queues 355 and 360 may be used to store packets associated with real time (RT) flows. A real time flow is a flow that may need immediate attention such as, for example, a flow associated with an interactive traffic.

The packets in the egress queues 355 and 360 may have higher priority than the packets in the egress queue 350 and, therefore, may be selected prior to the packets in the egress queue 350. In one embodiment, the packets in the egress queues 350–360 belong to flows that have contracted rates. The scheduler may select a packet based on the contracted rates. The scheduler may also select a packet based on other criteria. For example, the scheduler may select a packet based on an earliest deadline time. The deadline time may be an arrival time of the packet at the egress buffer, but more generally the deadline time may be calculated from the contracted rate of the packet, an arrival time of the packet at the egress buffer and a departure time of a previous packet from the same flow. For example, the deadline time of a $k^{th}$ packet may be calculated using the following formula: Deadline time ($k^{th}$ packet)=Max{Arrival time ($k^{th}$ packet), Departure time ($(k-1)^{th}$ packet))}+1/contracted rate.

The packet selection process performed by the scheduler may include multiple subprocesses. Each subprocess is performed at one level of the hierarchy 390. The subprocess selects the next node by doing a minimum of all deadlines of nodes at the next level. For example, the packet selection process used to select a packet at a top of the egress queue 350 includes a different subprocess performed at each of levels 300, 305 and 325. In this example, a first subprocess at the level 300 is performed to select node 310 from among the nodes 310, 315 and 320. A second subprocess is performed at the level 305 to select node 335 from among the nodes 330, 335 and 340. A third subprocess is performed at the level 325 to select the first packet in the egress queue 350 from among the egress queues 350, 355 and 360 located at level 345. Performance of each of the subprocesses at each level corresponds to making a packet selection based on the selection criteria. When the hierarchy 390 is deep (e.g., multiple levels), more time is required to traverse the tree from the root 301 in order to select a packet at the leaf level 345.

Traditionally, a packet selection process cannot be started until a previous packet selection process is completed. Each packet selection process may be viewed as having its own path from the root 301 of the hierarchy 390 to the appropriate leaf 350–360 of the hierarchy 390 at the level 345.

When each of the subprocess at each of the levels 300, 305, 325 takes one time slot, an entire packet selection process for the hierarchy 390 illustrated in FIG. 3 takes on an average of three time slots. For example, when one time slot is 176 nanoseconds (ns), a packet is selected at every 3×176 ns. Therefore, a packet is sent to the output link at every 3×176 ns. When the hierarchy 390 is deep, the packet selection process could take longer to sort through all the different levels to select a packet. Similarly, it would take longer for the output link to receive a packet from the scheduler.

Figure 4:
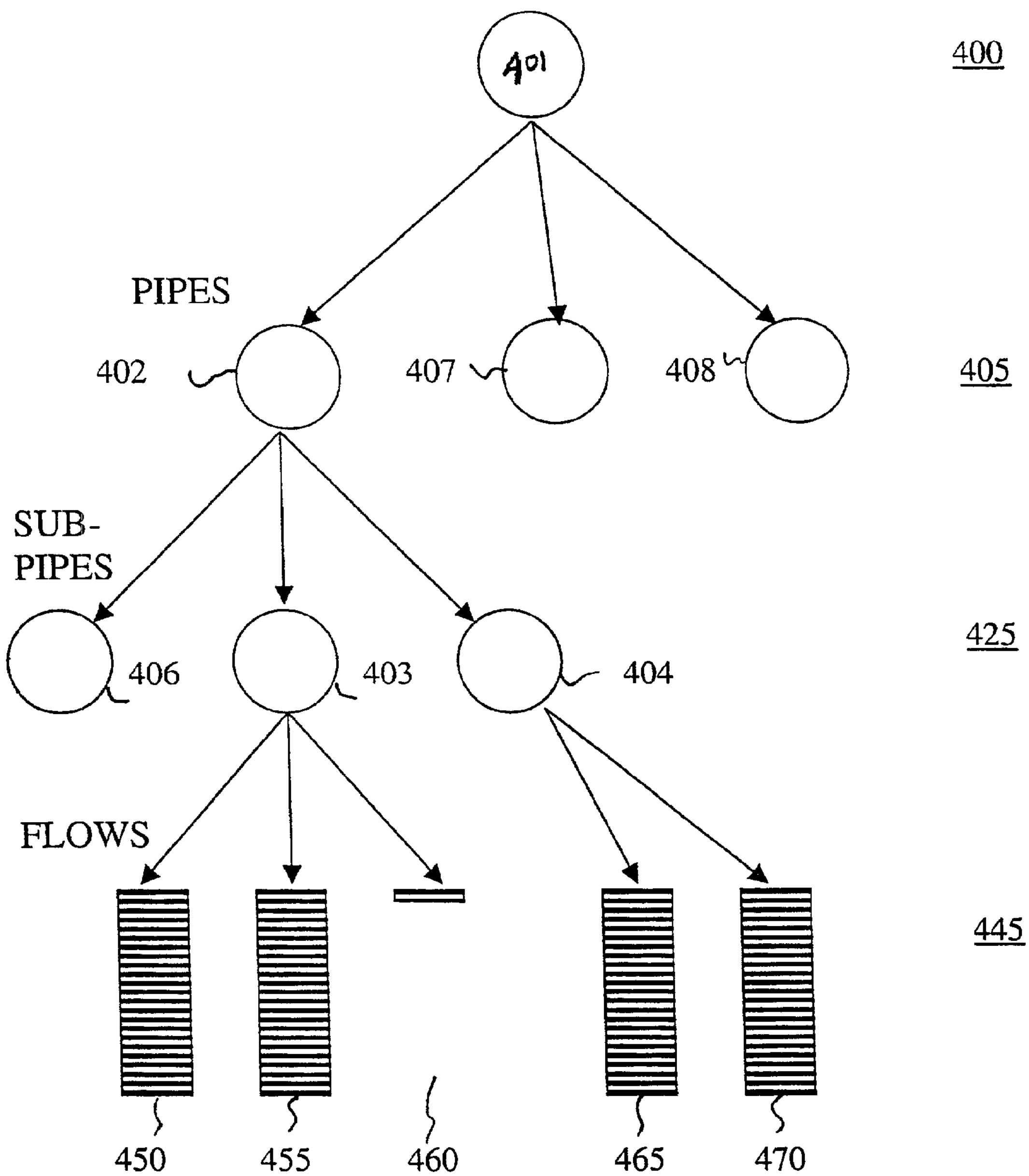
FIG. 4 is an exemplary diagram illustrating one embodiment of a pipelining scheduling hierarchy.

FIG. 4 is an exemplary diagram illustrating one embodiment of a pipelining scheduling hierarchy. In one embodiment, multiple packet selection processes can be overlapped to reduce the time that the output link has to wait in between receiving packets from the scheduler. Referring to FIG. 4, a packet selection process uses a pipe and one or more subpipes to select a packet associated with a flow from the egress queues. For example, a first packet selection process having the pipe 402 and the subpipe 403 is used to select a packet from the egress queue 450. Similarly, a second packet selection process having the pipe 402 and the subpipe 404 is used to select a packet from the egress queue 465. Using pipelining, the second packet selection process can be started without having to wait for the first packet selection process to be completed, thus allowing the two packet selection processes to be overlapped.

In one embodiment, the second packet selection process is started one time slot after the first packet selection process is started. For example, after the first packet selection process decides on the subpipe 403, the second packet selection process could be started with the pipe 402. When the first packet selection process selects the packet from the egress queue 450, the second packet selection process could be selecting the subpipe 404. At the same time, a third packet selection process could be started with the pipe 407, etc.

Initially, it may take three time slots to get a first packet since there is no previous packet selection process. However, after the first two time slots, a packet can be selected and sent to the output link at every subsequent time slot. This makes the packet selection process efficient as no time slots are left empty When one subpipe executing at a higher level (e.g., at time slot “n”) is dependent on a subpipe executing at a lower level (e.g., at time slot “n−1”), the executing of the subpipe at the higher level may be based on a wrong assumption that when the leaf level of the hierarchy is reached, a packet is available to be selected. However, the two subpipes may not be executing in concert to prevent the wrong assumption. For example, referring back to FIG. 4, if the first packet selection process includes the pipe 402, the subpipe 403 and the flow in the egress queue 460, then a second packet selection process that includes the pipe 402, the subpipe 403 and the flow in the egress queue 460 would have no packet to select. This is because the one packet remaining in the egress queue 460 has already been selected by the first packet selection process in a previous time slot. This leaves the egress queue 460 empty. When the second packet selection process selects a subpipe that leads to an empty egress queue, it must be discarded and a new packet selection process is started so a different subpipe can be selected. The problem described above is referred to as a dependency problem. The dependency problem occurs when it is too late for the second packet selection process to select a different subpipe.

In one embodiment, a lock is used to prevent subsequent packet selection processes from selecting the same subpipe as a current packet selection process. The lock allows execution of one subpipe to not affect execution of another subpipe. The lock may be a single value, which indicates status of the lock (e.g., locked or unlocked), or the lock may be a counter, which indicates a number of packets remaining in the queue. For example, when the counter value for the lock is at one (1), there is only one packet left. When the subpipe is selected, the counter is reduced to zero (0) and a subsequent packet selection process cannot select the same subpipe (because it is locked) and instead has to select another subpipe. The counter value is updated when new packets are placed into the appropriate egress queue. Therefore, when the counter value goes from 0 to 1, the lock can be removed.

In one embodiment, when a lock is set, the subsequent packet selection processes is forced to choose among the remaining subpipes. Using the above example, when the first packet selection process locks the subpipe 403, the second packet selection process is forced to choose between the remaining subpipes 404 and 406. Alternatively, the first packet selection process may lock the pipe 402 and forces the second packet selection process to choose between the pipes 407 and 408. The decision to lock the subpipe may be made before knowing the number of packets remaining in the flow. Thus, when the subpipe 402 is selected and a lock is set, the first packet selection process continues until the packet in the queue 403 is selected. This approach prevents the dependency problem and still allows a packet to be selected and sent to the output link at every time slot.

Figure 5:
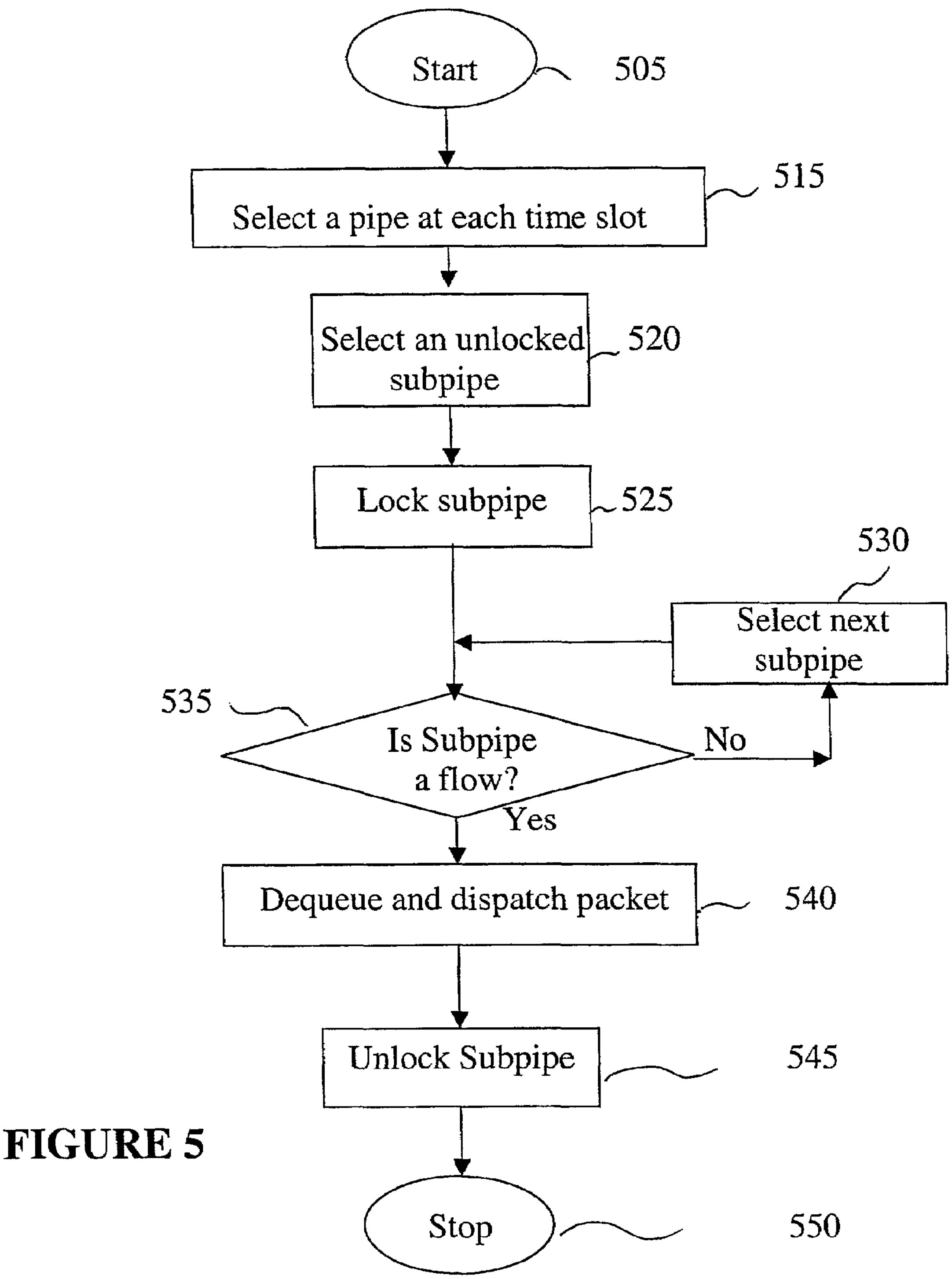
FIG. 5 is an exemplary flow diagram of one embodiment of a process of pipelining.

FIG. 5 is an exemplary flow diagram of one embodiment of a process of pipelining. The process is performed by processing logic that may comprise hardware (e.g., circuitry, dedicated logic, etc.), software (such as is run on a general purpose computer system or a dedicated machine), or a combination of both.

Referring to FIG. 5, the process starts at block 505. At the beginning of each time slot, a pipe is selected, as shown in block 515. At block 520, a subpipe is selected. The subpipe may be selected by performing a sort of all the subpipes at the same level based on a criteria associated with that level such as, for example, the contracted rates. In one embodiment, the selected subpipe is not locked by an active pipe, which has not reached the leaf level of the hierarchy. At block 525, the selected subpipe is locked to prevent subsequent pipes from selecting it.

At block 535, a determination is made to determine if the selected subpipe is a flow. When the selected subpipe is not a flow, the process moves to block 530, where a next subpipe at a next level of the hierarchy is selected. This process continues until the selected subpipe is a flow. When the selected subpipe is a flow, this indicates that the current pipe has reached the leaf level of the hierarchy where a packet is selected and sent to the output link, as shown in block 540. At block 545, the locked subpipe is unlocked and is available to be selected by the subsequent pipes. The process ends at block 550.

The technique described herein can be stored in the memory of a computer system as a set of instructions (i.e., software). The set of instructions may reside, completely or at least partially, within the main memory and/or within the processor to be executed. In addition, the set of instructions to perform the technique described herein could alternatively be stored on other forms of machine-readable media. For the purposes of this specification, the term “machine-readable media” shall be taken to include any media which is capable of storing or embodying a sequence of instructions for execution by the machine and that cause the machine to perform any one of the methodologies of the present invention. The term "machine readable media" shall accordingly be taken to include, but not limited to, optical and magnetic disks.

Alternatively, the logic to perform the technique discussed herein, could be implemented in additional computer and/or machine readable media, such as, for example, discrete hardware components as large-scale integrated circuits (LSI's), application-specific integrated circuits (ASIC's), firmware such as electrically erasable programmable read-only memory (EEPROM's), field programmable gate array (FPGA's), and electrical, optical, acoustical and other forms of propagated signals (e.g., carrier waves, infrared signals, digital signals, etc.), etc.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method for selecting packets comprising:

initiating a first packet selection process at a first time slot;

initiating a second packet selection process at a second time slot immediately following the first time slot such that execution of the second packet selection process overlaps execution of the first packet selection process at different levels of a scheduling hierarchy;

selecting a first packet at a third time slot in response to the first packet selection process; and selecting a second packet at a fourth time slot in response to the second packet selection process, the fourth time slot immediately following the third time slot, wherein each of the first packet selection process and the second packet selection process comprises two or more subprocesses executed to select the first packet and the second packet respectively, and wherein at least one of the subprocesses in the first packet selection process is different from the subprocesses in the second packet selection process.

2. The method of claim 1, wherein the first and second packets are selected based on an arrival time of the first and second packets at a corresponding egress queue and a departure time of a previous packet at the corresponding egress queue from a data flow associated with the first and second packets respectively.

3. The method of claim 1, wherein each of the two or more subprocesses in the first packet selection process and in the second packet selection process is executed in one time slot.

4. The method of claim 3, wherein each of the two or more subprocesses in the first packet selection process and in the second packet selection process is executed at a different level of the scheduling hierarchy.

5. The method of claim 1, wherein when a subprocess is selected by the first packet selection process, it is locked and cannot be selected by the second packet selection process.

6. The method of claim 5, wherein the subprocess is selected from one or more subprocesses at a same level of the scheduling hierarchy by sorting the one or more subprocesses at that level based on a selection criteria.

7. A method for selecting packets comprising:

initiating a first packet selection process at a first time slot;

initiating a second packet selection process at a second time slot immediately following the first time slot such that execution of the second packet selection process overlaps execution of the first packet selection process at different levels of a scheduling hierarchy;

selecting a first packet at a third time slot in response to the first packet selection process; and selecting a second packet at a fourth time slot in response to the second packet selection process, the fourth time slot immediately following the third time slot, wherein each of the first packet selection process and the second packet selection process comprises two or more subprocesses executed to select the first packet and the second packet respectively, wherein when a subprocess is selected by the first packet selection process, it is locked and cannot be selected by the second packet selection process, wherein the subprocess is selected from one or more subprocesses at a same level of the scheduling hierarchy by sorting the one or more subprocesses at that level based on a selection criteria, and wherein the selection criteria is one selected in a group comprising an arrival time and a contracted rate.

8. A computer readable medium having stored thereon sequences of instructions which are executable by a system, and which, when executed by the system, cause the system to:

initiate a first packet selection process at a first time slot;

initiate a second packet selection process at a second time slot immediately following the first time slot such that execution of the second packet selection process overlaps execution of the first packet selection process at different levels of a scheduling hierarchy;

select a first packet at a third time slot in response to the first packet selection process; and select a second packet at a fourth time slot in response to the second packet selection process, the fourth time slot immediately following the third time slot, wherein each of the first packet selection process and the second packet selection process comprises two or more subprocesses executed to select the first packet and the second packet respectively, and wherein at least one of the subprocesses in the first packet selection process is different from the subprocesses in the second packet selection process.

9. The computer readable medium of claim 8, wherein the first and second packets are selected based on an arrival time of the first and second packets at a corresponding egress queue and a departure time of a previous packet at the corresponding egress queue from a data flow associated with the first and second packets respectively.

10. The computer readable medium of claim 8, wherein each of the two or more subprocesses in the first packet selection process and in the second packet selection process is executed in one time slot.

11. The computer readable medium of claim 10, wherein each of the two or more subprocesses in the first packet selection process and in the second packet selection process is executed at a different level of the scheduling hierarchy.

12. The computer readable medium of claim 8, wherein when a subprocess is selected by the first packet selection process, it is locked and cannot be selected by the second packet selection process.

13. The computer readable medium of claim 12, wherein the subprocess is selected from one or more subprocesses at a same level of the scheduling hierarchy by sorting the one or more subprocesses at that level based on a selection criteria.

14. A computer readable medium having stored thereon sequences of instructions which are executable by a system, and which, when executed by the system, cause the system to:

initiate a first packet selection process at a first time slot;

initiate a second packet selection process at a second time slot immediately following the first time slot such that execution of the second packet selection process overlaps execution of the first packet selection process at different levels of a scheduling hierarchy;

select a first packet at a third tine slot in response to the first packet selection process; and select a second packet at a fourth time slot in response to the second packet selection process, the fourth time slot immediately following the third time slot, wherein when a subprocess is selected by the first packet selection process, it is locked and cannot be selected by the second packet selection process, wherein the subprocess is selected from one or more subprocesses at a same level of the scheduling hierarchy by sorting the one or more subprocesses at that level based on a selection criteria, and wherein the selection criteria is one selected in a group comprising an arrival time and a contacted rate.

15. A system, comprising:

a switch fabric; and an egress coupled with the switch fabric to initiate a first packet selection process at a first time slot, initiate a second packet selection process at a second time slot immediately following the first time slot such that execution of the second packet selection process overlaps execution of the first packet selection process at different levels of a scheduling hierarchy, select a first packet at a third time slot in response to the first packet selection process, and select a second packet at a fourth time slot in response to the second packet selection process, the fourth time slot immediately following the third time slot, wherein each of the first packet selection process and the second packet selection process comprises two or more subprocesses executed to select the first packet and the second packet respectively, and wherein at least one of the subprocesses in the first packet selection process is different from the subprocesses in the second packet selection process.

16. The system of claim 15, wherein the first and second packets are selected based on an arrival time of the first and second packets at a corresponding egress queue and a departure time of a previous packet at the corresponding egress queue from a data flow associated with the first and second packets respectively.

17. The system of claim 15, wherein each of the two or more subprocesses in the first packet selection process and in the second packet selection process is executed in one time slot.

18. The system of claim 17, wherein each of the two or more subprocesses in the first packet selection process and in the second packet selection process is executed at a different level of the scheduling hierarchy.

19. The system of claim 15, wherein when a subprocess is selected by the first packet selection process, it is locked and cannot be selected by the second packet selection process.

20. The system of claim 19, wherein the subprocess is selected from one or more subprocesses at a same level of the scheduling hierarchy by sorting the one or more subprocesses at that level based on a selection criteria.

21. A system, comprising:

a switch fabric; and an egress coupled with the switch fabric to initiate a first packet selection process at a first time slot, initiate a second packet selection process at a second time slot immediately following the first time slot such that execution of the second packet selection process overlaps execution of the first packet selection process at different levels of a scheduling hierarchy, select a first packet at a third time slot in response to the first packet selection process, and select a second packet at a fourth time slot in response to the second packet selection process, the fourth time slot immediately following the third time slot, wherein each of the first packet selection process and the second packet selection process comprises two or more subprocesses executed to select the first packet and the second packet respectively, wherein when a subprocess is selected by the first packet selection process, it is locked and cannot be selected by the second packet selection process, wherein the subprocess is selected from one or more subprocesses at a same level of the scheduling hierarchy by sorting the one or more subprocesses at that level based on a selection criteria, and wherein the selection criteria is one selected in a group comprising an arrival time and a contracted rate.

* * * * *